(12) United States Patent
Kiyokawa et al.

(10) Patent No.: US 6,306,339 B1
(45) Date of Patent: Oct. 23, 2001

(54) METHOD FOR MANUFACTURING HYDROGEN STORAGE MATERIAL

(75) Inventors: Tadashi Kiyokawa; Hajime Kiyokawa; Masayuki Takashima, all of Fukui (JP)

(73) Assignee: Kiyokawa Plating Industries, Co., Ltd., Fukui (JP)

( * ) Notice: Subject to any disclaimer, the term of this patent is extended or adjusted under 35 U.S.C. 154(b) by 0 days.

(21) Appl. No.: 09/688,038

(22) Filed: Oct. 10, 2000

Related U.S. Application Data

(62) Division of application No. 09/106,165, filed on Jun. 29, 1998, now Pat. No. 6,143,052.

(30) Foreign Application Priority Data

Jul. 3, 1997 (JP) .................................................... 9-178731
Aug. 1, 1997 (JP) .................................................... 9-208026

(51) Int. Cl.$^7$ .................................................... C22C 1/08
(52) U.S. Cl. .................................................... 419/2; 419/8; 419/10; 419/35; 419/36; 419/37; 419/48; 427/216; 427/217; 427/220
(58) Field of Search ............................... 419/2, 8, 10, 35, 419/36, 37, 48; 427/216, 217, 220

(56) References Cited

U.S. PATENT DOCUMENTS

| | | | |
|---|---|---|---|
| 4,605,603 | 8/1986 | Kanda et al. | 429/59 |
| 4,636,445 | 1/1987 | Yamano et al. | 429/53 |
| 5,387,478 | 2/1995 | Muta et al. | 429/59 |
| 5,389,468 | 2/1995 | Fujiwara et al. | 429/206 |
| 5,682,592 | 10/1997 | Yun et al. | 419/65 |
| 5,766,676 | 6/1998 | Park et al. | 427/123 |
| 5,874,168 | 2/1999 | Kiyokawa et al. | 428/407 |

FOREIGN PATENT DOCUMENTS 04283268A 10/1992 (JP) .

*Primary Examiner*—Ngoclan Mai
(74) *Attorney, Agent, or Firm*—Akin, Gump, Strauss, Hauer & Feld, L.L.P.

(57) ABSTRACT

A hydrogen storage material is disclosed with no collapse due to pulverization of hydrogen storage alloy particles by repeated hydrogen absorption and desorption thereby permitting repeated use while manifesting excellent electric and thermal conductivities. Pressure molding of hydrogen storage alloy particles, each being covered with a plated metal film having microgranules of a thermoplastic resin, at a temperature higher than a glass transition temperature or a melting point of and below a thermal decomposition temperature of the thermoplastic resin can produce a porous hydrogen storage material of hydrogen storage alloy particles being bonded to each other via the thermoplastic resin. The hydrogen storage material can become firm and strong because the plated metal films covering the hydrogen storage alloy particles are clasped with each other complexly.

14 Claims, 3 Drawing Sheets

METHOD FOR MANUFACTURING HYDROGEN STORAGE MATERIAL

CROSS-REFERENCE TO RELATED APPLICATION

This is a divisional application of U.S. patent application Ser. No. 09/106,165, filed Jun. 29, 1998 is now U.S. Pat. No. 6,143,052.

BACKGROUND OF THE INVENTION

The present invention relates to a hydrogen storage material comprising particles of a hydrogen storage alloy and a method for manufacturing the same. The present invention is also directed to an electrode of a hydrogen storage alloy for use in negative electrodes of nickel-metal hydride storage batteries as a specific application of the hydrogen storage material and a method for manufacturing the electrode.

Recently, there is a wide application of hydrogen storage alloys which can absorb therein and desorb therefrom hydrogen in a reversible manner. For example, it becomes possible to reserve or convey hydrogen safely in an ordinary vessel if only a hydrogen storage alloy material is included in the vessel. Since hydrogen storage alloys allow selective absorption and desorption of hydrogen, they can also be used for refining hydrogen. Their other application includes a converter for a variety of energy by utilizing exothermic and endothermic reactions of the hydrogen storage alloys during their hydrogen absorption and desorption. They can also be applied as electrode materials for the clean nickel-metal hydride storage batteries affording a high energy density which should be replaced with conventional nickel-cadmium storage batteries. Those nickel metal-hydride storage batteries have been utilized as the power sources for a variety of portable electronic equipment, electric vehicles, etc.

The hydrogen storage alloy is in nature collapsed and pulverized into fine particles when it is forced to absorb therein and desorb therefrom hydrogen repeatedly. The hydrogen storage alloy, therefore, has a drawback that when it is used for storing, conveying or refining hydrogen, those pulverized particles become fugacious out of the alloy together with hydrogen gas, reducing the amount of reserved hydrogen or clogging a filter included in a refining device. The use of this hydrogen storage alloy for electrode has a drawback that pulverization of the alloy into fine particles will take place if charge and discharge operations are repeated for an electrode including such alloy, which in turn causes the pulverized particles to fall off from the surface of an electrode substrate, thereby decreasing the discharge capacity of a battery using the electrode, resulting in impaired life of the battery. The hydrogen storage alloy is disadvantageously poor in thermal conductivity, which restricts its use as an energy converter.

Proposed methods for solving these problems include: 1) to add a resin binder to hydrogen storage alloy particles and pressure-mold the resultant mixture to a hydrogen storage alloy material or 2) to plate particles of a hydrogen storage alloy with a metal film and subsequently pressure-mold the plated alloy particles into a hydrogen storage alloy material. In the former method, the binding force between the particles can be enhanced by increasing the amount of a binder, but this disadvantageously decreases the amount of hydrogen storage per unit weight of the alloy. In the latter method, although it depends on the kind of metal used for plating, the resultant alloy material is insufficient in strength despite strong to a certain degree.

SUMMARY OF THE INVENTION

In view of the above-mentioned problems, the object of the present invention is to provide a hydrogen storage material which does not develop any collapse due to pulverization of particles of an alloy used for the material caused by repeated absorption and desorption of hydrogen in and out of the alloy, thereby permitting its repeated use.

Another object of the present invention is to provide a hydrogen storage material having a large hydrogen occluding capacity and exceptional electric and thermal conductivities.

Still another object of the present invention is to provide a long cycle life hydrogen storage alloy electrode developing no collapse due to pulverization of the alloy particles even after repeated charge and discharge cycles, by establishing mutual contact of the alloy particles to substantially eliminate resistance inside the electrode, thereby preventing voltage drops due to electrode resistance.

The present invention provides a method for manufacturing a hydrogen storage alloy material comprising a step of pressure-molding particles of a hydrogen storage alloy, each surface of the particles being covered with a plated metal film having microgranules of a thermoplastic resin, at a temperature which is higher than a glass transition temperature or a melting point of and below a thermal decomposition temperature of the thermoplastic resin, thereby manufacturing a porous hydrogen storage material.

The hydrogen storage material in accordance with the present invention is a porous body having a three-dimensionally communicating space facing most of the hydrogen storage alloy particles directly or via plated metal films, the space being occupied in part by the thermoplastic resin so as to effect firm binding between the hydrogen storage alloy particles.

Because of this structure, the hydrogen storage material in accordance with the present invention can have a large hydrogen storage capacity per unit weight of the material and does not collapse even when it is forced to absorb therein and desorb therefrom hydrogen repeatedly, thus permitting recurrent use. The metal films plated on the hydrogen storage alloy particles impart electric and thermal conductivities to the material.

The hydrogen storage alloy electrode in accordance with the present invention comprising such hydrogen storage alloy material is thus large in electric capacity per unit weight of the electrode and endures repeated charge and discharge operations with no development of a collapse, thereby allowing repeated use. In addition, because of the electric conductivity imparted by the metal films plated on the alloy particles, resistance in the electrode can substantially be prevented and voltage drops due to electrode resistance can also be eliminated, which enables high-rate charge and discharge operations for a battery including the electrode.

The estimated mechanism that the hydrogen storage material in accordance with the present invention does not collapse even after it repeatedly absorbs therein and desorbs therefrom hydrogen is that the thermoplastic resin incorporated in the metal films plated on the hydrogen storage alloy particles enters a space between those alloy particles and effectively functions as a binder when it is pressure-molded together with the alloy particles at a temperature higher than a glass transition metal or a melting point of the resin, and that the metal films plated on the hydrogen storage alloy particles are clasped with each other complexly so as to be firmly bonded to each other mechanically when they are molded together with the particles at a high pressure.

As mentioned previously, the method for manufacturing a hydrogen storage alloy material in accordance with the present invention comprises the steps of preparing hydrogen storage alloy particles covered with a plated metal film having microgranules of a thermoplastic resin, and pressure-molding the hydrogen storage alloy particles at a temperature which is higher than a glass transition temperature or a melting point of and below a thermal decomposition temperature of the thermoplastic resin, thereby obtaining a porous body of the hydrogen storage alloy particles being bonded with each other firmly via the thermoplastic resin.

Another method for manufacturing a hydrogen storage material in accordance with the present invention comprises the steps of preparing hydrogen storage alloy particles covered with a plated metal film having microgranules of a thermoplastic resin and a porous metal substrate, positioning the hydrogen storage alloy particles on one or both surfaces of the porous metal substrate, and pressure-molding the hydrogen storage alloy particles and the porous metal substrate at a temperature which is higher than a glass transition temperature or a melting point of and below a thermal decomposition temperature of the thermoplastic resin, thereby obtaining a porous body comprising the hydrogen storage alloy particles being bonded with each other firmly via the thermoplastic resin and integrating the metal substrate on one surface or in an inside of the porous metal substrate.

In a preferred mode of the present invention, the hydrogen storage alloy particles have a diameter of 10 to 100 $\mu$m, and the plated metal films on those particles have a thickness of 0.01 to 50 $\mu$m and are present at 0.1 to 50 parts by weight of 100 parts of the hydrogen storage alloy. The resin microgranules contained in the plated metal film have a diameter of 0.01 to 50 $\mu$m and are present at 0.1 to 30 parts by weight of 100 parts of the hydrogen storage alloy.

In a further preferred mode of the present invention; the plated metal films on the hydrogen storage alloy particles have a thickness of 1 to 10 $\mu$m and are present at 1 to 10 parts by weight of 100 parts of the hydrogen storage alloy. The resin microgranules contained in the plated metal film have a diameter of 1 to 5 $\mu$m and are present at 1 to 10 parts by weight of 100 parts of the hydrogen storage alloy.

The hydrogen storage material in accordance with the present invention having a porosity of 10 to 40%, preferably 20 to 30% can be obtained by pressure-molding a hydrogen storage alloy particle-thermoplastic resin microgranule composite satisfying the above-mentioned conditions at a temperature higher than a glass transition temperature or a melting point of and below a thermal decomposition temperature of the thermoplastic resin at a pressure of 10 to 10,000 kg/cm$^2$.

The hydrogen storage material in accordance with the present invention is characterized by uniform distribution of the thermoplastic resin microgranules functioning as a binder in the molded hydrogen storage material, because they are contained in the plated metal film disposed on the surface of the hydrogen storage alloy particles. This feature facilitates production of a hydrogen storage material which is higher in strength and lower in concentration of binder than those in the conventional hydrogen storage material obtained by molding a mere mixture of hydrogen storage alloy particles and particles of a binder resin. Especially, the use of the hydrogen storage alloy particle-thermoplastic resin microgranule composite satisfying the condition stated in the further preferred mode of the present invention facilitates production of a hydrogen storage material having a large hydrogen absorbing capacity per unit volume of the material. Application of this material to electrodes ensures an electrode of large capacity per unit volume of the electrode.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
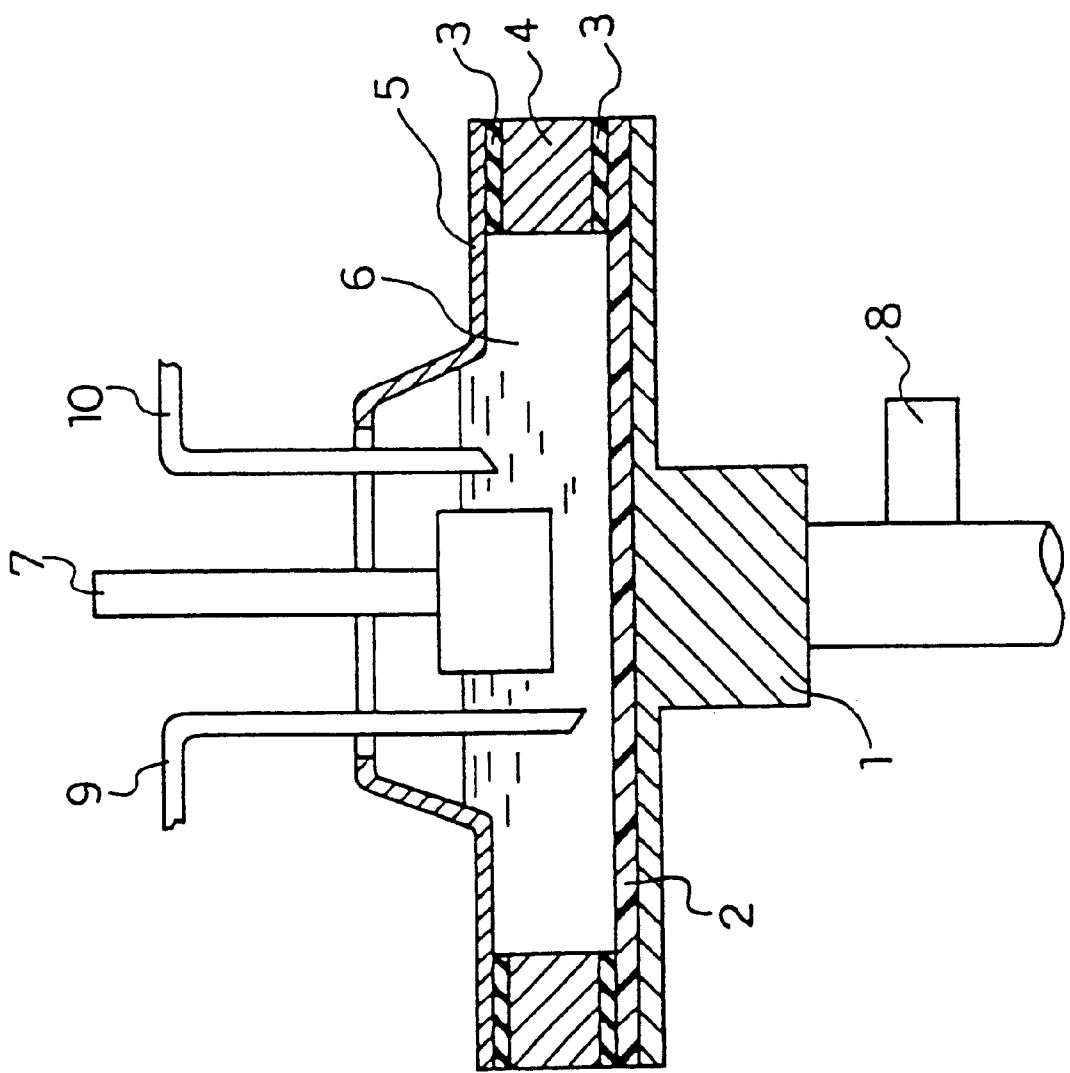
FIG. 1 is a longitudinal cross-sectional view illustrating the structure of a plating device used in the following examples of the present invention.

In a preferred mode of the present invention, the plated metal film covering each of the hydrogen storage alloy particles includes a metal material selected from metals or alloys of Ni, Cu, Co, Ni—P, Ni—B, Cu—P and Co—B. The plated film is preferably a porous film having a porosity not disturbing diffusion of hydrogen. A suitable thickness of the plated film is 0.01 to 50 $\mu$m, preferably 1 to 10 $\mu$m.

Electrolytic plating baths for forming a plated film with copper or a copper alloy incorporating therein microgranules of a thermoplastic resin on the surface of the hydrogen storage alloy include copper sulfate bath, copper cyanide bath and copper diphosphoric acid bath. Among them, the copper diphosphoric acid bath is advantageous because it can produce a plated film with large amounts of co-deposited microgranules of the thermoplastic resin and a great contact angle with the hydrogen storage alloy. As the plating baths for forming a nickel-plated film, a Watt bath, electrolytic or electroless Ni—P plating bath or others may be used in addition to amidosulfuric acid bath. Any known plating bath can also be used to form a film of the above-listed metals or alloys.

As the thermoplastic resin, water-repellent fluorocarbon resins, such as polytetrafluoroethylene (PTFE), are suited when the hydrogen storage material is applied for electrodes. Suitable particle diameter of the fluorocarbon resin is 0.01 to 50 $\mu$m, preferably 1 to 5 $\mu$m.

However, when a fluorocarbon resin with strong water repellency is used in forming a plated metal film incorporating therein microgranules of the resin on the surface of each of the hydrogen storage alloy particles, it becomes necessary to add a large amount of a surfactant to a plating bath in order to increase their affinity for a plating solution. If a surfactant is added, there is a risk of adhesion of the surfactant onto the resultant plated film thereby producing some inconvenience such as hygroscopic or hydrogen contaminating behavior by the surfactant. For obviating such inconvenience, thermoplastic resins including no fluorine are suited as the thermoplastic resins to be incorporated in the plated. film. Fluorine-free thermoplastic resins may be exemplified as ABS resin, acetal, methacrylic resin, cellulose acetate, chlorinated polyether, ethylene-vinyl acetate copolymer, ethylene-vinyl alcohol copolymer, ionomer, polyacrylonitrile, polyamide, polyamide imide, polyarylate, polybutylene, polybutylene terephthalate, polycarbonate, polyether ether ketone, polyether imide, polyether ketone, polyether sulfone, polyethylene, polyethylene terephthalate, polyimide, poly-4-methyl pentene-1, polyphenylene ether, polyphelene sulfide, polypropylene, polystyrene, polysulfone, vinyl acetate resin, vinyl chloride resin, vinylidene chloride resin, AS resin and the like.

Especially, one selected from the group consisting of ABS resin, polyamide, polysulfone, AS resin, polystyrene, vinylidene chloride resin, polyphenylene ether, methyl pentene resin and methacrylic resin is used preferably.

The suitable range of particle diameter for such water-repellent thermoplastic resin is 0.01 to 50 $\mu$m, preferably 1 to 5 $\mu$m.

In molding the hydrogen storage alloy particles whose surface is plated with a metal film incorporating therein microgranules of a thermoplastic resin, although it varies according to the resin used, the molding pressure may be lowered in general if the particles are heated at a high temperature. Suitable heating temperatures should be higher than the glass transition temperature or the melting point of and below the thermal decomposition temperature of the thermoplastic resin. The heating temperature is usually 50 to 400° C. and the molding pressure is suitably 10 to 10,000 kg/cm$^2$.

Any known hydrogen storage alloys usually applied for such hydrogen storage material can be used for the present invention. AB$_5$-type (rare earth element system) alloys represented by LaNi$_5$ and MmNi$_5$ (Mm represents Mischmetal), AB/A$_2$B-type (titanium system) alloys represented by TiNi and Ti$_2$Ni, and AB$_2$-type (Laves phase) alloys represented by Ti$_{2-x}$Zr$_x$V$_{4-y}$Ni$_y$ and ZrV$_{0.4}$Ni$_{1.6}$ may be exemplified. An alloy having a particle diameter of about 0.01 to about 2 mm, preferably about 10 to about 100 $\mu$m is better.

As the hydrogen storage alloys used for constituting the electrode in accordance with the present invention, the below-listed conventionally known alloys can be used. An alloy having a particle diameter of about 0.1 to about 500 $\mu$m, preferably 10 to 100 $\mu$m is better.

(1) Examples of conventional AB$_5$-type (rare earth element system) alloys represented by the formula AB$_x$ where A is one or a mixture of two or more selected from the group consisting of La, Ce, Pr, Nd, Ca and Zr and B is one or a mixture of two or more selected from the group consisting of Ni, Co, Mn, Al, Cu, Fe nd B, and where x 4.5 to 5.5:

LaNi$_5$, LaNi$_4$Cu, LaNi$_4$Al, LaNi$_{2.5}$Co$_{2.5}$, La$_{0.8}$Nd$_{0.2}$Ni$_2$Co$_3$, La$_{0.7}$Nd$_{0.2}$Ti$_{0.1}$Ni$_{2.5}$Co$_{2.4}$Al$_{0.1}$, La$_{0.8}$Nd$_{0.2}$Ni$_{2.5}$Co$_{2.4}$Si$_{0.1}$, La$_{0.9}$Zr$_{0.1}$Ni$_{4.5}$Al$_{0.5}$, MmNi$_5$, MmNI$_{3.55}$CO$_{0.75}$Mn$_{0.4}$Al$_{0.3}$, MmNi$_{4.2}$Mn$_{0.6}$Al$_{0.2}$, MmNi$_3$Co$_{1.5}$Al$_{0.5}$ (2) Examples of conventional AB/A$_2$B-type (titanium or magnesium system) alloys:

TiNi, Ti$_2$Ni, TiMn$_{1.5}$, Ti$_2$Ni-TiNi-based multicomponent alloys (Ni is partially substituted with V, Cr, Zr, Mn, Co, Cu, Fe, or the like), such as Ti$_{1-y}$Zr$_y$Ni$_x$ (x=0.5 to 1.45, y=0 to 1); MgNi, Mg$_2$Ni, MgMn$_{1.5}$, Mg$_2$Ni-MgNi-based multicomponent alloys (Ni is partially substituted with V, Cr, Zr, Mn, Co, Cu, Fe, or the like)

(3) Examples of conventional AB$_2$-type (Laves phase) alloys represented by the formula AB$_x$ where A is one or a mixture of two or more selected from the group consisting of Ti, Zr, Cr, La and Ce and B is one or a mixture of two or more selected from the group consisting of Ni, Cr, Mn, V, Fe, Mn and Co, and where x=1.5 to 2.5:

Ti$_{2-x}$Zr$_x$V$_{4-y}$Ni$_y$, Ti$_{1-x}$Cr$_x$V$_{2-y}$Ni$_y$, ZrV$_{0.4}$Ni$_{1.6}$, ZrMn$_{0.6}$Cr$_{0.2}$Ni$_{1.2}$, Ti$_{17}$Zr$_{15}$V$_{22}$Ni$_{39}$Cr$_7$, LaNi$_2$, CeNi$_2$

In manufacturing the hydrogen storage material in accordance with the present invention, it is technically advantageous to integrate during the molding process the substrate which can serve as a thermal conductor or a current collector for the electrode. As the substrate, perforated metal plate, metal mesh, metal fiber felt, and foamed metal sheet can be used.

In the following, the method for plating the hydrogen storage alloy particles with a composite film composed of thermoplastic resin microgranules and a metal will be described.

First, alloy particles are washed and degreased. For example, after ultrasonic washing with water for about 10 min, the particles are immersed in an aqueous solution bath of a commercially available degreasing agent OP-113 (Okuno Pharmaceutical Co., Ltd.) at 60° C. for about 10 min. Then, if electrolytic plating is adopted, the particles are subjected to a pretreatment with an acid (treatment with 10% acetic acid at 25° C. for 3 min) before plating.

If electroless plating is adopted, the alloy particles are similarly subjected to a pretreatment with an acid before plating. When the alloy particles are resistant to plating, they are further immersed in a sensitizing solution containing 30 g/l Tin (II) chloride and 15 ml/l hydrochloric acid at 25° C. for 3 min, followed by washing with water. Then, those alloy particles are immersed in an activating solution containing 0.2 g/l palladium chloride and 4 ml/l hydrochloric acid at 25° C. for another 3 min, followed by washing with water. This activating treatment is repeated twice.

Next, the method for electrolytic plating will be described.

FIG. 1 shows a rough structure of a barrel plating device used in the following examples of the present invention.

A substantially disc-shaped cell is prepared by fixing a cell base on a turntable 1, fixing a ring-like cathode plate 4 sandwiched between packings 3 onto the cell base 2, and finally mounting thereon a cover 5. The cell accommodates a plating solution 6 into which an anode 7 is inserted. The cathode 4 is electrically connected to the turntable 1, which is connected to a power source via a brush 8.

After placing pretreated hydrogen storage alloy particles in the cell, the cell is rotated at a high rate (400 rpm), which brings the alloy particles into contact with the ring-like cathode plate 4 located at the periphery by a centrifugal force. Then, the alloy particles are fed with electricity and plated. The plating solution is supplied through a supplier nozzle 9. Excess plating solution is fed back to an outer reservoir via a drainer nozzle 10. By setting the draining level of the plating solution slightly higher than the supply level, the plating solution in the cell is held at a constant level determined by the lower end height of the drainer nozzle 10.

Figure 2:
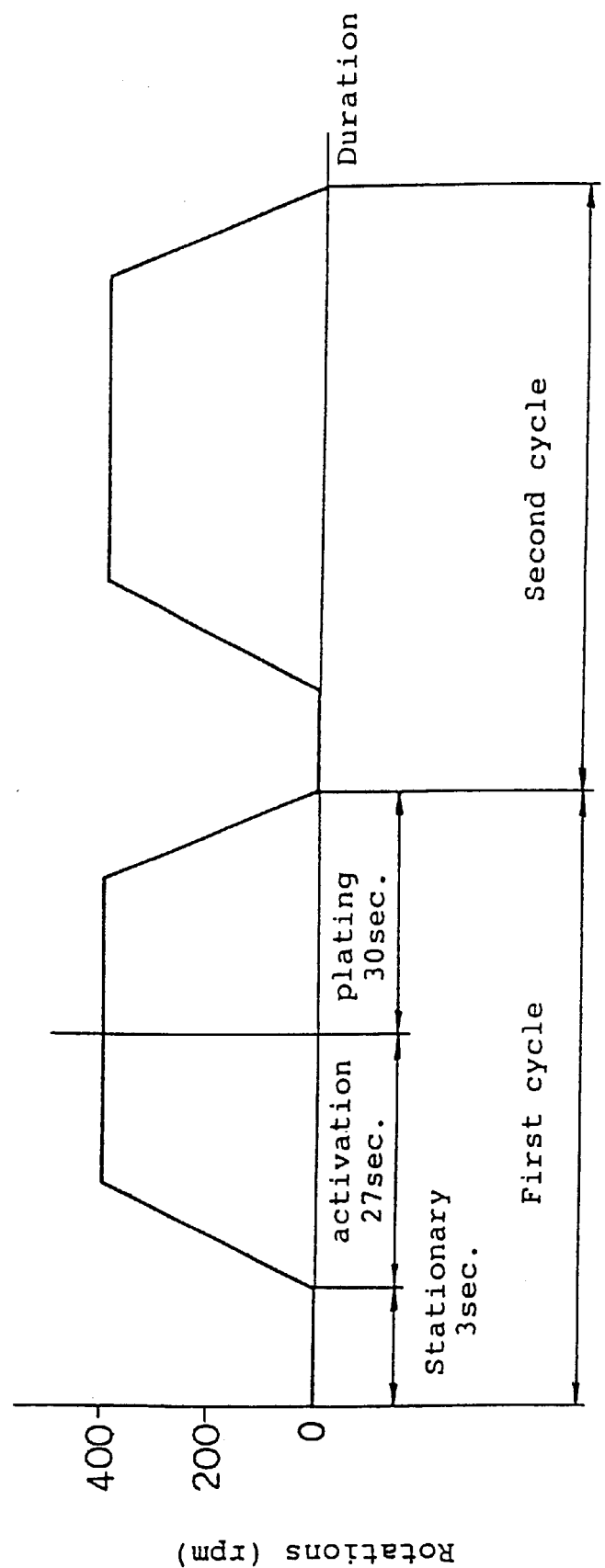
FIG. 2 is a time chart illustrating operations of the plating device.

In performing plating using this plating device, as shown in FIG. 2, the cell is rested for initial 3 seconds before starting a motor for activating the cell. After the cell is rotated at a constant rate of 400 rpm, the motor is stopped to sedate the rotation of the cell. For effecting plating, a current flow is passed across the anode 7 and the cathode 4 for 30 seconds from the time point when 27 seconds have passed after starting the motor until the sedation of the rotation of the cell. After a rest for 3 seconds, the cell is rotated again in the same or counter direction and a current flow is passed again across the anode and the cathode for the latter 30 seconds of the cell rotation for effecting plating. While repeating this cycle, the plating solution and the alloy particles are both agitated thereby realizing substantially homogeneous plating on the alloy particles. The plating solution is drained only when almost all the alloy particles are brought into contact with the ring-like cathode 4 by a centrifugal force induced by the cell rotation in order to prevent possible drains of the floating alloy particles in the plating solution when the cell rotation is stopped or accelerated.

In the following, the present invention will be described by way of specific examples.

EXAMPLE 1

Using the above-mentioned plating device, electrolytic plating was performed for 8 g of particles of an alloy $MmNi_{3.55}Co_{0.75}Mn_{0.4}Al_{0.3}$ having a mean particle diameter of 50 $\mu m$. The composition of the plating bath, plating conditions and the thickness of the resultant plated film are listed below. Plating time represents the time required for the cycles and conduction time represents the sum of current flow for effecting plating.

| Electrolytic plating with nickel (amidosulfuric acid bath) | |
| --- | --- |
| $Ni(NH_2SO_3)_2 \cdot 4H_2O$ | 350 (g/l) |
| $NiCl_2 \cdot 6H_2O$ | 45 (g/l) |
| $H_3BO_3$ | 40 (g/l) |
| Surfactant | 1.0 (g/l) |
| PTFE | 100 (g/l) |
| pH | 4.0 |
| Cathode current density | 10 $A/dm^2$ |
| Temperature | 50° C. |
| Anode | Ni plate |
| Agitation | circulation |
| Plating time | 30 min (conduction time: 15 min) |
| Film thickness | 3 $\mu m$ |

PTFE used represents particles of polytetrafluoroethylene having a mean particle diameter of 5 $\mu m$ (molecular weight: about 7,500 to about 10,500).

Hydrogen storage alloy particles (2.5 g) electrolytically plated with a nickel film containing PTFE microgranules were filled in a metallic dye mounted on a molding apparatus with a heater and molded into a pellet of 20 mm diameter at a pressure of 400 $kg/cm^2$ in an argon gas atmosphere. Heating sequence during molding included elevation of the temperature over 2 hours at a constant rate from 25° C. up to 300° C., holding the maximal temperature for 2 hours and the subsequent lowering of the temperature over 6 hours down to 25° C.

The resultant molded plate had a porosity of about 27%. The molded plate was solidified very hard such that it could be cut or sliced with a diamond saw easily.

Figure 3:
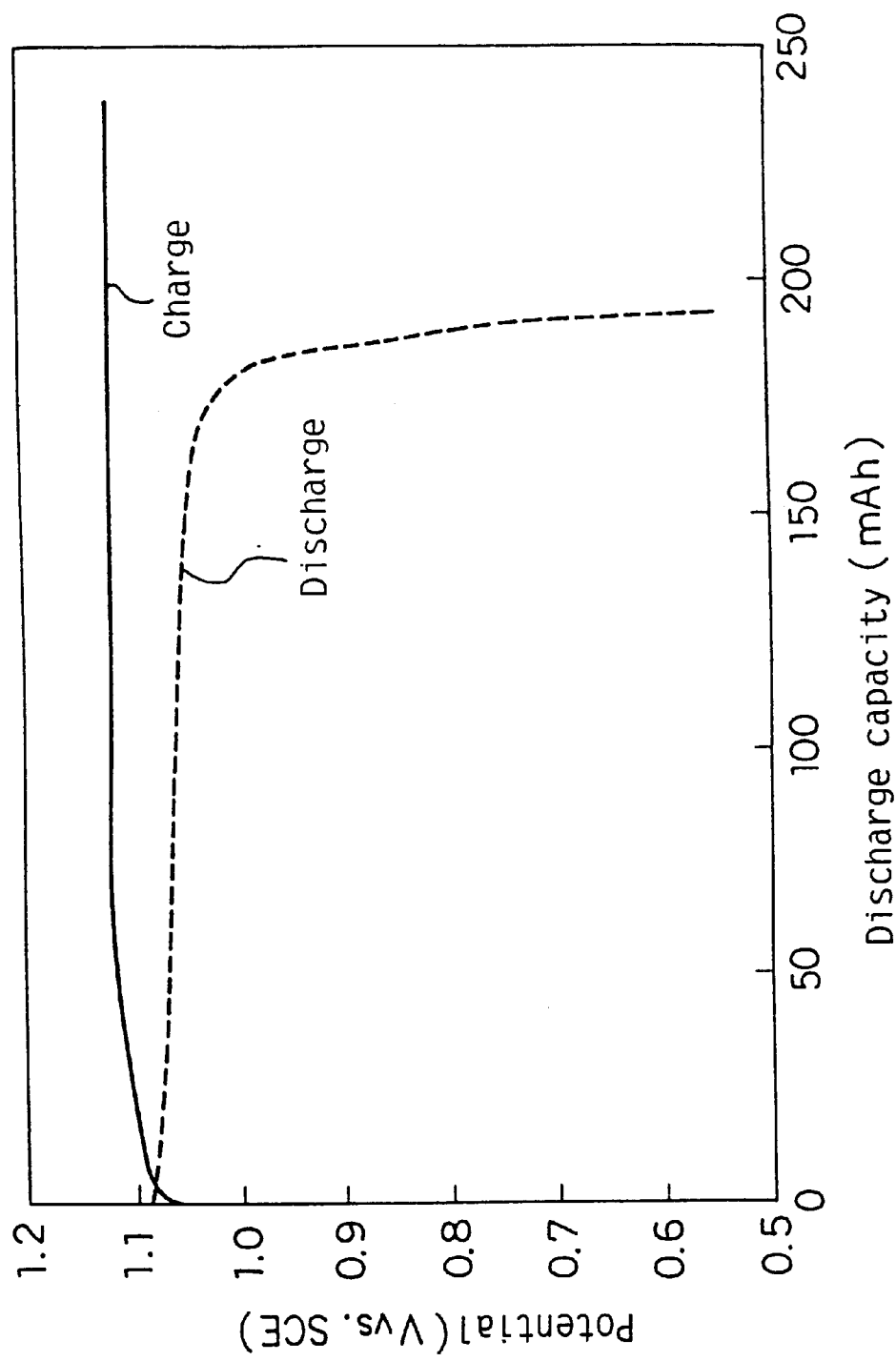
FIG. 3 is a graph depicting potential changes during charge and discharge operations for a molded electrode of one example in accordance with the present invention.

Then, the molded plate was drilled at its ends to form a hole through which a platinum wire was to be passed for fixing it to the molded plate as an electrode lead. The negative electrode thus produced was charged at a current of 12 mA for 20 hours in a 6 N aqueous caustic potash solution, using a nickel hydroxide positive electrode having a sufficiently higher capacity than the negative electrode as counter electrode, followed by discharging at a current of 6 mA for 40 hours. The charge and discharge cycle was repeated. Changes in potential at cycle 3 are shown in FIG. 3. The potential represents a potential with respect to a saturated calomel electrode (SCE). As seen from FIG. 3, the hydrogen storage alloy electrode prepared from the very hard and densely solidified molded plate obtained in this example can function as a battery electrode. It can also be understood that since the molded plate has a moderate porosity, it is applicable to a negative electrode for sealed storage batteries for which gas absorption is an essential requisite.

Example 2

In this example, hydrogen storage alloy particles electrolytically plated with a nickel film containing methacrylic resin microgranules were produced under the same conditions as applied in Example 1, except that microgranules of a methacrylic resin having a mean particle diameter of 5 $\mu m$ were used as resin microgranules in place of PTFE and contained in a plating bath at 2 g/l, together with a surfactant at 100 g/l.

The alloy particles plated with a nickel film were then pressure-molded under the same conditions as applied in Example 1. The resultant molded plate had a porosity of about 29% and solidified very hard. It also could be cut or sliced with a diamond saw. For comparison, hydrogen storage alloy particles with no plating treatment were mixed with resin microgranules and the mixture was pressure-molded under the same conditions as applied in Example 1. The molded plate of Example 2 had an almost similar hydrogen occluding capacity per unit weight of the hydrogen storage alloy to that of the comparative example.

As discussed above, according to the present invention, a hydrogen storage material of a very hard and densely solidified molded plate having a moderate porosity can be obtained. Therefore, the hydrogen storage material in accordance with the present invention can endure repeated charge and discharge operations without developing any collapse due to pulverization of the hydrogen storage alloy particles and thus can be used repeatedly. The hydrogen storage material in accordance with the present invention also has excellent electric and thermal conductivities because of the presence of metal films plated on the hydrogen storage alloy particles, and further of the metal substrate. The present invention can also provide a long cycle life hydrogen storage alloy electrode which is almost free of internal resistance and voltage drops due to electrode resistance, and does not collapse due to pulverization of the hydrogen storage alloy particles even when charge and discharge cycles are repeated.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for manufacturing a hydrogen storage material comprising the steps of:

preparing hydrogen storage alloy particles covered with a plated metal film having microgranules of a thermoplastic resin, and pressure-molding said hydrogen storage alloy particles at a temperature which is higher than a glass transition temperature or a melting point of and below a thermal decomposition temperature of said thermoplastic resin, thereby obtaining a porous body of said hydrogen storage alloy particles being bonded with each other firmly via said thermoplastic resin.

2. A method for manufacturing a hydrogen storage material comprising the steps of:

preparing hydrogen storage alloy particles covered with a plated metal film having microgranules of a thermoplastic resin and a porous metal substrate, positioning said hydrogen storage alloy particles on one or both surfaces of said porous metal substrate, and pressure-molding said hydrogen storage alloy particles and said porous metal substrate at a temperature which is higher than a glass transition temperature or a melting point of and below a thermal decomposition temperature of said thermoplastic resin, thereby obtaining a porous body comprising said hydrogen storage alloy particles being bonded with each other firmly via said thermoplastic resin and integrating said metal substrate on one surface or in an inside of said porous metal substrate.

3. The method for manufacturing a hydrogen storage material in accordance with claim 1, wherein a porous body with said plated films covering said hydrogen storage alloy particles being mechanically bonded to each other is obtained by said pressure-molding step.

4. The method for manufacturing a hydrogen storage material in accordance with claim 2, wherein a porous body with said plated films covering said hydrogen storage alloy particles being mechanically bonded to each other is obtained by said pressure-molding step.

5. The method for manufacturing a hydrogen storage material in accordance with claim 1, wherein said plated film is a metal material selected from metals or alloys of Ni, Cu, Co, Ni—P, Ni—B, Co—P and Co—B.

6. The method for manufacturing a hydrogen storage material in accordance with claim 2, wherein said plated film is a metal material selected from metals or alloys of Ni, Cu, Co, Ni—P, Ni—B, Co—P and Co—B.

7. The method for manufacturing a hydrogen storage material in accordance with claim 1, wherein said thermoplastic resin is fluorocarbon resin.

8. The method for manufacturing a hydrogen storage material in accordance with claim 2, wherein said thermoplastic resin is fluorocarbon resin.

9. The method for manufacturing a hydrogen storage material in accordance with claim 1, wherein said thermoplastic resin is one or a mixture of two or more selected from the group consisting of ABS resin, polyamide, polysulfone, AS resin, polystyrene, vinylidene chloride resin, polyphenylene ether, methyl pentene resin and methacrylic resin.

10. The method for manufacturing a hydrogen storage material in accordance with claim 2, wherein said thermoplastic resin is one or a mixture of two or more selected from the group consisting of ABS resin, polyamide, polysulfone, AS resin, polystyrene, vinylidene chloride resin, polyphenylene ether, methyl pentene resin and methacrylic resin.

11. The method for manufacturing a hydrogen storage material in accordance with claim 1, wherein said pressure molding is performed at a pressure of 10 to 10,000 kg/cm$^2$.

12. The method for manufacturing a hydrogen storage material in accordance with claim 2, wherein said pressure molding is performed at a pressure of 10 to 10,000 kg/cm$^2$.

13. The method for manufacturing a hydrogen storage material in accordance with claim 1, wherein said plated metal films on said hydrogen storage alloy particles have a thickness of 1 to 10 $\mu$m and are present at 1 to 10 parts by weight of 100 parts of said hydrogen storage alloy, and said resin microgranules contained in said plated metal film have a diameter of 1 to 5 $\mu$m and are present at 1 to 10 parts by weight of 100 parts of said hydrogen storage alloy.

14. The method for manufacturing a hydrogen storage material in accordance with claim 2, wherein said plated metal films on said hydrogen storage alloy particles have a thickness of 1 to 10 $\mu$m and are present at 1 to 10 parts by weight of 100 parts of said hydrogen storage alloy, and said resin microgranules contained in said plated metal film have a diameter of 1 to 5 $\mu$m and are present at 1 to 10 parts by weight of 100 parts of said hydrogen storage alloy.

* * * * *